United States Patent
Izvorski et al.

(10) Patent No.: US 10,937,195 B2
(45) Date of Patent: Mar. 2, 2021

(54) LABEL BASED APPROACH FOR VIDEO ENCODING

(71) Applicant: Google LLC, Mountain View, CA (US)

(72) Inventors: Alexander Izvorski, San Francisco, CA (US); Makarand Dharmapurikar, Fremont, CA (US); Justin Bischoff, Mountain View, CA (US)

(73) Assignee: Google LLC, Mountain View, CA (US)

( * ) Notice: Subject to any disclaimer, the term of this patent is extended or adjusted under 35 U.S.C. 154(b) by 580 days.

(21) Appl. No.: 14/177,461

(22) Filed: Feb. 11, 2014

(65) Prior Publication Data
US 2014/0226722 A1    Aug. 14, 2014

Related U.S. Application Data

(60) Provisional application No. 61/763,411, filed on Feb. 11, 2013, provisional application No. 61/778,123, filed on Mar. 12, 2013.

(51) Int. Cl.
*H04N 19/54* (2014.01)
*G06T 9/00* (2006.01)

(52) U.S. Cl.
CPC .............. *G06T 9/001* (2013.01); *H04N 19/54* (2014.11)

(58) Field of Classification Search
CPC .................. G06T 9/001; H04N 19/54
USPC ...................................... 375/240.14, 240.16
See application file for complete search history.

(56) References Cited

U.S. PATENT DOCUMENTS

| | | | | |
|---|---|---|---|---|
| 2004/0101056 A1* | 5/2004 | Wong | ...................... | H04N 19/70 375/240.25 |
| 2004/0165776 A1* | 8/2004 | Brouwer | .................... | G06T 7/20 382/181 |
| 2008/0205779 A1* | 8/2008 | Dogaru | .................... | G06T 9/001 382/238 |
| 2009/0116760 A1* | 5/2009 | Boon | .................... | H04N 19/105 382/238 |
| 2012/0014565 A1* | 1/2012 | Akiyama | .............. | G06T 7/2033 382/106 |
| 2012/0014606 A1* | 1/2012 | Yamazoe | ................ | G06T 7/251 382/190 |
| 2014/0196102 A1* | 7/2014 | Parm | ................ | H04N 21/23418 725/110 |
| 2014/0354675 A1* | 12/2014 | Lottes | ..................... | G06T 5/002 345/591 |
| 2015/0350679 A1* | 12/2015 | Heo | ...................... | H04N 19/597 375/240.12 |

* cited by examiner

*Primary Examiner* — Jae N Noh
(74) *Attorney, Agent, or Firm* — Byrne Poh LLP

(57) ABSTRACT

Disclosed is an approach for encoding a current video frame that includes labeling points/regions for the current video frame using graphics information for the current video frame, matching the points/regions of the current video frame with points/regions of a previous video frame using the labels for the points/regions of the current video frame and deriving motion vectors for the points/regions of the current video frame.

15 Claims, 13 Drawing Sheets

LABEL BASED APPROACH FOR VIDEO ENCODING

CROSS-REFERENCE TO RELATED APPLICATIONS

The present application claims the benefit of U.S. Provisional Application 61/763,411 filed on Feb. 11, 2013 and also U.S. Provisional Application 61/778,123 filed on Mar. 12, 2013, which are hereby incorporated by reference in their entirety.

FIELD OF THE INVENTION

The invention relates to the field of video encoding, and in particular to a label based approach for video encoding.

BACKGROUND

Video encoding is a mechanism used to reduce the amount of data needed to transmit video. This is especially important where a video stream is rendered at a server and transmitted to a client device for display. Because of bandwidth limitations between the server and the client device, it is important that video data is encoded in a manner that reduces bandwidth utilization. Current techniques take advantage of data redundancy between frames in a video stream by deriving and transmitting motion vectors that describe motion between frames rather than transmitting the entire video frame itself. In this way the amount of data being transmitted may be greatly reduced.

Currently, motion vectors are generated by rendering a previous frame, rendering the current frame and performing matching between points/regions of the current frame and points/regions of the previous frame to generate a motion vector for each point/region of the current frame. Because the current frame has no information about the previous frame, each point/region of the current frame must be compared to the entirety of the previous frame in a brute force manner in order to match that point/region of the current frame. This method does not lend itself to parallelization and leads to large magnitudes of resource consumption and power consumption. Additionally, this technique is not always accurate as false matches sometimes occur during the matching process.

SUMMARY

Some embodiments of the present invention provide an improved approach for encoding a current video frame that includes labeling points/regions for the current video frame using graphics information for the current video frame, matching the points/regions of the current video frame with points/regions of a previous video frame using the labels for the points/regions of the current video frame and deriving motion vectors for the points/regions of the current video frame.

Further details of aspects, objects, and advantages of the invention are described below in the detailed description, drawings and claims. Both the foregoing general description and the following detailed description are exemplary and explanatory and are not intended to be limiting as to the scope of the invention.

BRIEF DESCRIPTION OF THE DRAWINGS

The drawings illustrate the design and utility of embodiments, in which similar elements are referred to by common reference numerals. These drawings are not necessarily drawn to scale. In order to better appreciate how the above-recited and other advantages and objects are obtained, a more particular description of the embodiments will be rendered, which are illustrated in the accompanying drawings. These drawings depict only typical embodiments and are not therefore to be considered limiting of its scope.

DETAILED DESCRIPTION

Various embodiments are described hereinafter with reference to the figures. It should be noted that the figures are not necessarily drawn to scale. It should also be noted that the figures are only intended to facilitate the description of the embodiments, and are not intended as an exhaustive description of the invention or as a limitation on the scope of the invention. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments.

Video encoding is a mechanism used to reduce the amount of data needed to transmit video. This is especially important where a video stream is rendered at a server and transmitted to a client device for display. Because of bandwidth limitations between the server and the client device, it is important that video data is encoded in a manner that reduces bandwidth utilization. Current techniques take advantage of data redundancy between frames in a video stream by deriving and transmitting motion vectors that describe motion between frames rather than transmitting the entire video frame itself. In this way the amount of data being transmitted may be greatly reduced.

Currently, motion vectors are generated by rendering a previous frame, rendering the current frame and performing matching between points/regions of the current frame and points/regions of the previous frame to generate a motion vector for each point/region of the current frame. Because the current frame has no information about the previous frame, each point/region of the current frame must be compared to the entirety of the previous frame in a brute force manner in order to match that point/region of the current frame. This method of matching is not very parallelizable and leads to large magnitudes of resource consumption and power consumption. Additionally, this technique is not always accurate as false matches sometimes occur during the matching process.

Figure 1:
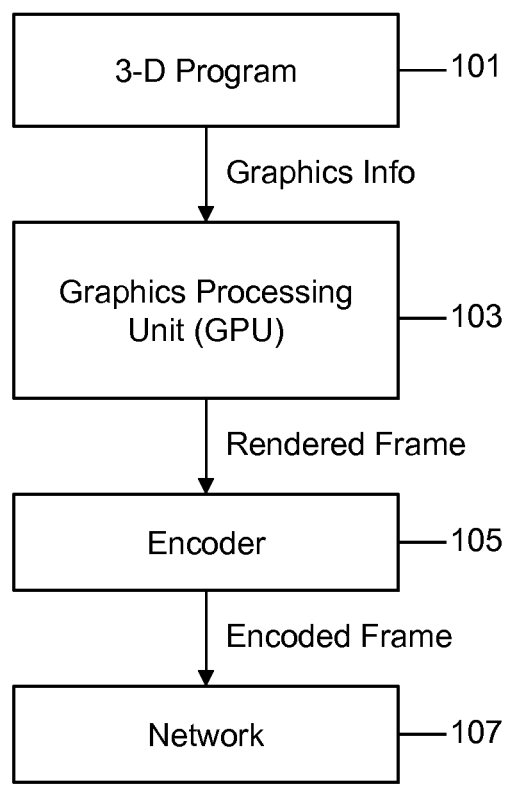
FIG. 1 is a block diagram illustrating a conventional video encoding process

FIG. 1 is a block diagram illustrating a conventional video encoding process. Initially a video program 101 generates graphics information which is fed to a graphics processing unit (GPU) 103. The video program may be a game or may be any another program that generates three-dimensional graphics information to be rendered by a GPU 103. The GPU 103 then utilizes this graphics information to render a video frame. Typically this graphics information includes both information that corresponds to a three-dimensional model space and information that corresponds to a two-dimensional space (e.g, screen coordinates) that the three-dimensional model space is to be transformed into.

The graphics information may include draw calls, primitives, model coordinate information, and texture coordinate information. Draw calls are graphics information utilized for rendering objects in a video frame. For example, a draw call may include several commands to be performed in rendering a particular object in a video frame. Primitives are triangles or polygons that form the building blocks that are to be rendered in a video frame. Each primitive may include a set of vertices which describe the primitive's position in the video frame. Model coordinates describe individual points for the video frame three-dimensional model space. Model coordinates are transformed into two-dimensional coordinates for rendering a video frame. Texture coordinates describes how individual pixels of a video frame should be generated. For example, a texture for a video frame may be overlaid on top of the objects and primitives making up the video frame. The characteristics of individual pixels in a texture may be identified using texture coordinates.

The GPU 103 may utilize this information to render a video frame. The video frame may then be encoded by an encoder 105 and transmitted over a network 107 to be displayed. Conventionally, a video frame is encoded in the manner described above, wherein each point/region of a current video frame is compared to the entirety of a previous video frame in a brute force manner in order to match that point/region of the current frame to a corresponding point/region of the previous video frame. This is a computationally intensive and resource heavy process.

By utilizing some of the graphics information generated by the video program to label video frames, a more efficient technique for encoding video frames may be achieved. Currently, the encoder has no way of utilizing graphics information generated by the video program because the encoder is only provided rendered frames and no additional information. By providing a mechanism by which video frames may be labeled, matches between points/regions in a current video frame and points/regions in a previous video frame may be more quickly and efficiently located.

Various methods can be used for obtaining the graphics information generated by the video program in order to label video frames.

Figure 2:
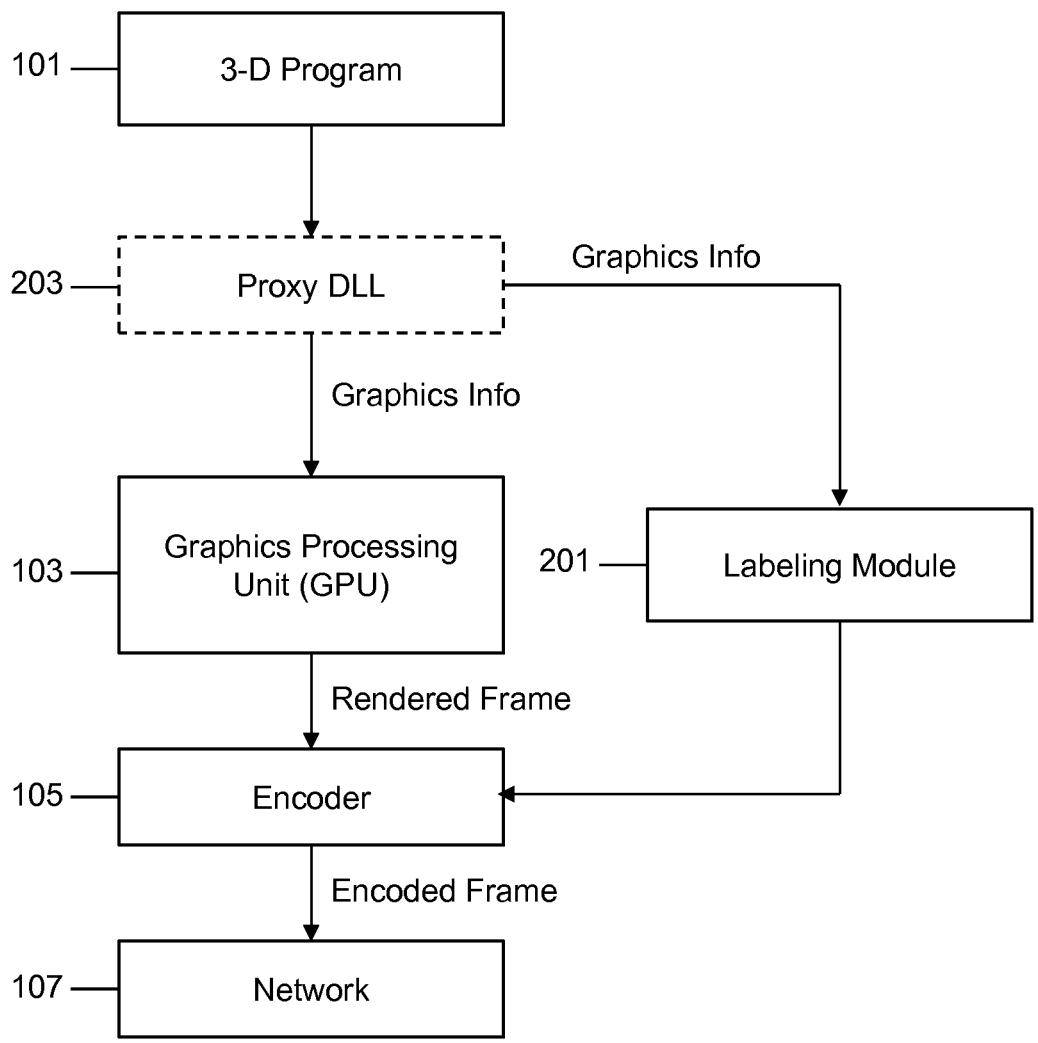
FIG. 2 illustrates a method for obtaining graphics information to be used for labeling video frames according to some embodiments.

FIG. 2 illustrates a method for obtaining graphics information to be used for labeling video frames according to some embodiments. In FIG. 2, an intermediate software layer, referred to herein as a proxy DLL 203 may be inserted in the video encoding pipeline between the video program 101 and the GPU 103. The proxy DLL 203 may intercept graphics information from the video program 101, and provide a copy of this intercepted graphics information to both the GPU 103 and a labeling module 201. The labeling module 203 may then utilize this graphics information to label individual video frames. In some embodiments, the labeling module 203 may also be configured to determine motion vectors for a video frame, which will be described in greater detail below. In other embodiments, the labeling module 203 may forward labeled frames to another processing module for determining motion vectors for that video frame. After the motion vectors have been determined they are then forwarded to the encoder 105, which encodes the video frame using the determined motion vectors.

Figure 3:
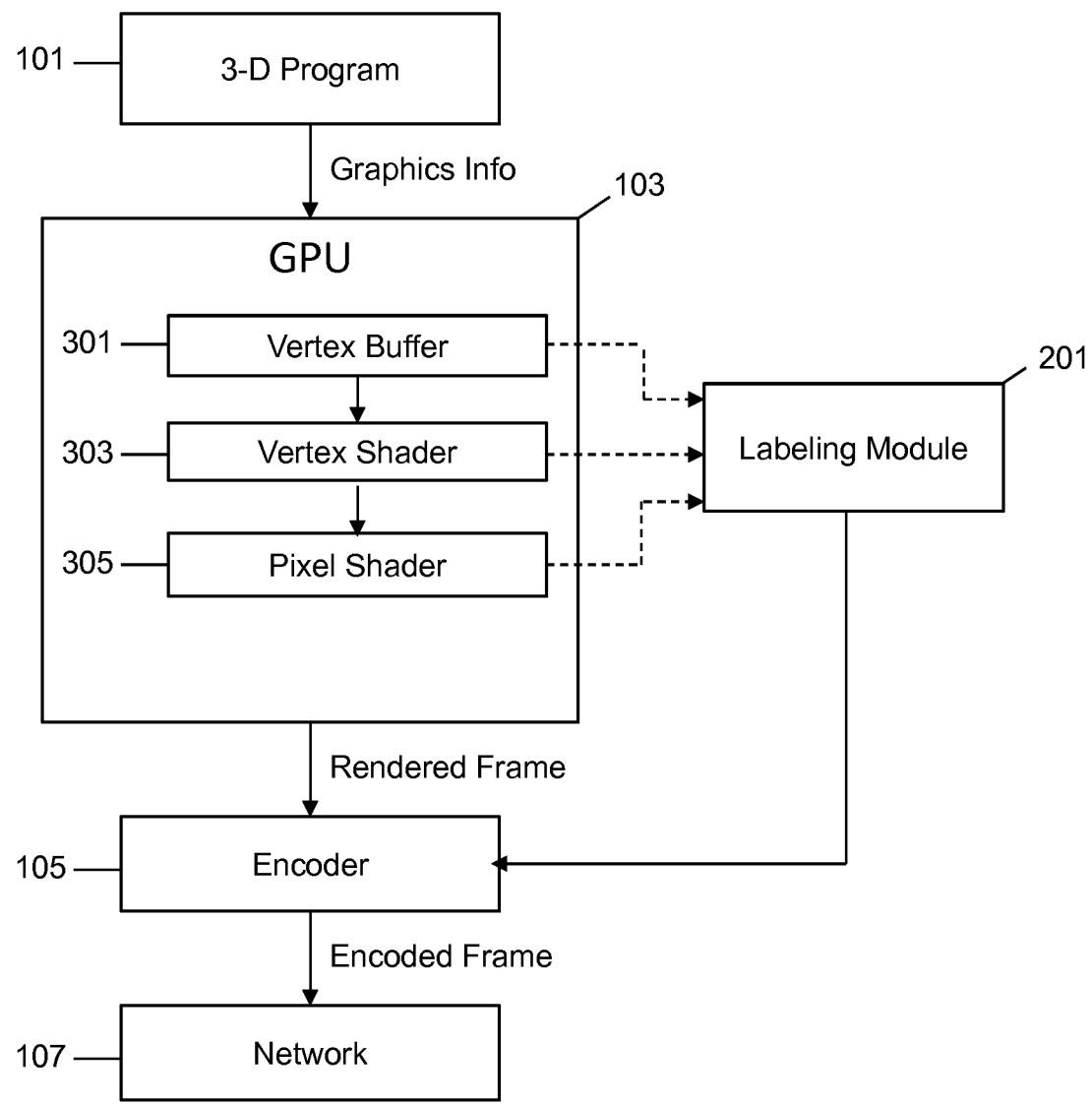
FIG. 3 illustrates an alternative method for obtaining graphics information to be used for labeling video frames according to some embodiments

FIG. 3 illustrates an alternative method for obtaining graphics information to be used for labeling video frames according to some embodiments. In FIG. 3, the labeling module 201 may be configured to retrieve graphics information directly from the GPU 103. The GPU may include a vertex buffer 301, a vertex shader 303, and a pixel shader 305. The vertex buffer 301 contains vertex information in a three-dimensional model space. The vertex shader 303 transforms the three-dimensional model space vertex information into two-dimensional vertex information. The pixel shader 305 applies color and texture to individual pixels in the two-dimensional space. For example, the vertex buffer 301 may include three-dimensional model space vertex information for a particular item to be rendered for a video frame. The vertex buffer 301 may pass on that information to the vertex shader 303, which transforms the three-dimensional model space vertex information into two-dimensional vertex information. This two-dimensional vertex information may then be passed on the pixel shader 305, which applies color and texture to the individual pixels that correspond to the item described by the two-dimensional vertex information.

The graphics information utilized for labeling may be retrieved from various components of the GPU, including the vertex buffer 301, the vertex shader 303, and the pixel shader 305. The labeling module 203 may then utilize this graphics information to label individual video frames. In some embodiments, the labeling module 203 may also be configured to determine motion vectors for a video frame, which will be described in greater detail below. In other embodiments, the labeling module 203 may forward labeled frames to another processing module for determining motion vectors for that video frame. After the motion vectors have been determined they are then forwarded to the encoder 105, which encodes the video frame using the determined motion vectors.

Once the graphics information for a video frame has been obtained by the labeling module, a process for labeling the video frame and determining motion vectors for the video frame based on the labels may be performed. Various methods for labeling the video frame and determining motion vectors for the video frame based on the labels may be used.

Figure 4:
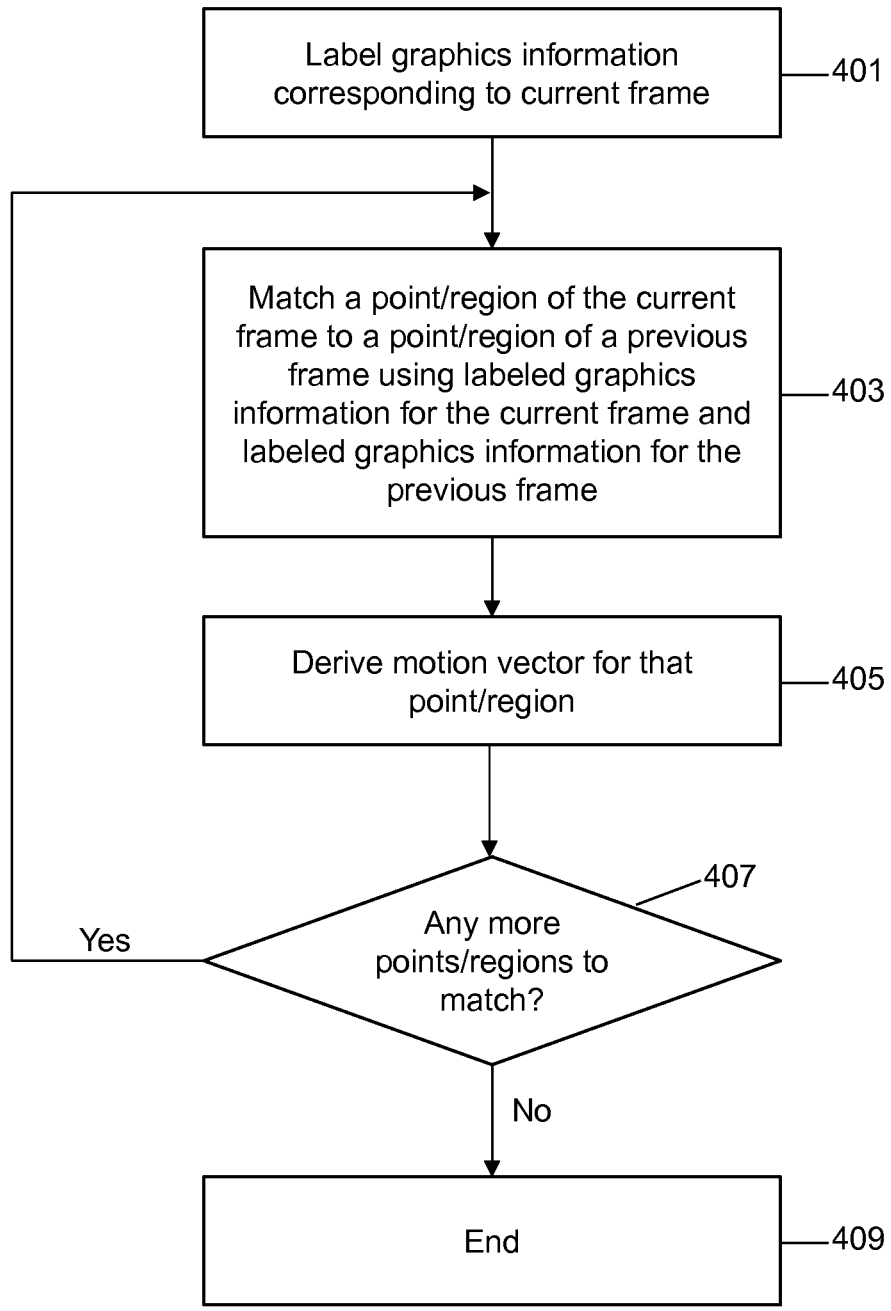
FIG. 4 is a flow chart illustrating a general method for determining motion vectors for points/regions of a video frame using a label-based approach according to some embodiments

FIG. 4 is a flow chart illustrating a general method for determining motion vectors for points/regions of a video frame using a label-based approach according to some embodiments. Graphics information corresponding to a current frame is labeled as described at 401. In some embodiments, each draw call for a current frame may be uniquely labeled. In other embodiments, each primitive for a current frame may be uniquely labeled. This information may be obtained using any of the approaches described above.

Next, a point/region of the current frame is matched with a point/region of a previous frame using the labeled graphics information as described at 403. The point/region of the current frame may be matched with the point/region of the previous frame using a spatial index, which will be described in greater detail below.

In some embodiments, individual points in a current frame are matched with individual points in a previous frame. In other embodiments, regions (e.g., a set of individual points) in a current frame are matched with regions (e.g., a set of individual points) in a previous frame. In some embodiments, only a subset of points/regions in the current frame is matched with points/regions of a previous frame. In other embodiments all of the points/regions of the current frame are matched with points/regions of the previous frame.

In some embodiments, a point/region of the current frame is matched with a point/region from more than one previous frame. In such embodiments, the previous frame of the more than one previous frames with the best match may be determined and used.

In some embodiments, a point/region of the current frame having a draw call label is matched with a point/region of the previous frame having the same draw call label. In other embodiments, a point/region of the current frame having a primitive label is matched with a point/region of the previous frame having the same primitive label. In other embodiments, a point/region of the current frame having a draw call label and model space coordinate is matched with a point/region of the previous frame having the same draw call label and a similar model space coordinate. In other embodiments, a point/region of the current frame having a primitive label and texture coordinate is matched with a point/region of the previous frame having the same primitive label and a similar texture coordinate.

Creating labels for video frames improves the efficiency of the matching process because each point/region in a current frame no longer has to be compared to the entirety of the previous frame. Instead, each point/region in a current frame need only be compared to those points/regions in the previous frame(s) with matching labels.

Once a point/region of the current frame is matched with a point/region of a previous frame, a motion vector may be derived for that point/region as described at 405. In some embodiments, the motion vector may simply be the difference between the screen coordinates of the point/region in the current frame and the screen coordinates of the matching point/region in the previous frame.

A determination is then made as to whether any more points/regions need to be matched as described at 407. If there are no more points/regions to be matched, then the method ends as described at 409. If there are more points/regions to be matched, then the method moves back to step 403, where another point/region of the current frame is matched.

In some embodiments a motion vector for a block of points (e.g., macroblock) may be obtained from the motion vectors of the individual points. In some embodiments, the motion vector for the block of points may be determined from the motion vectors of the individual points by picking a best match using a block matching metric such as sum of absolute transformed differences (SATD), sum of absolute difference (SAD), sum of squared differences (SSD), or sum of absolute inverse discrete cosine transform (IDCT) coefficients.

Figure 5:
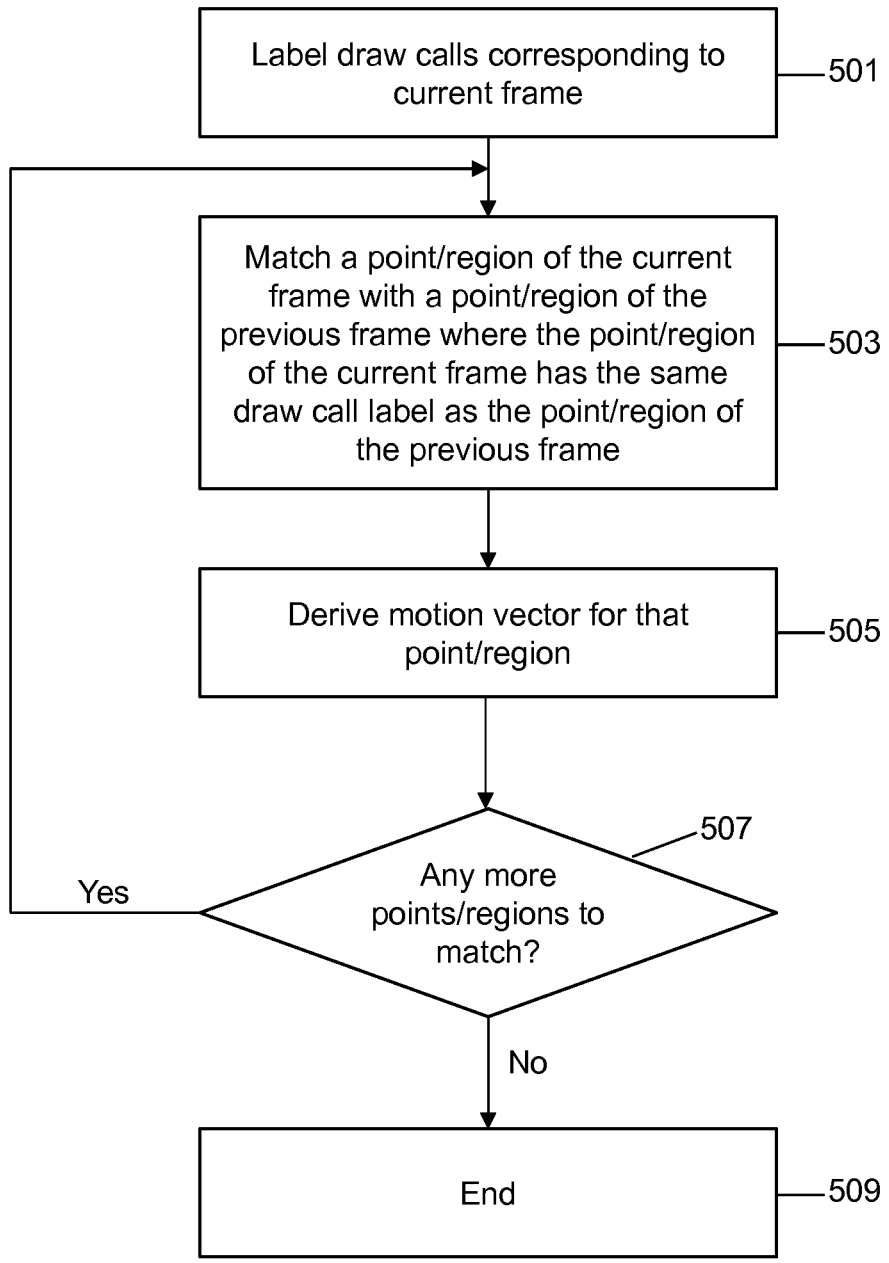
FIG. 5 is a flow chart illustrating a method for determining motion vectors for points/regions of a video frame that utilizes draw call labels according to some embodiments.

FIG. 5 is a flow chart illustrating a method for determining motion vectors for points/regions of a video frame that utilizes draw call labels according to some embodiments. Draw calls corresponding to a current frame are labeled as described at 501. In some embodiments, the draw call labels are derived from the order of the draw call within the current frame. For example, a frame may have a number of draw calls to be performed in a particular order associated with it and each draw call may be labeled using its order number. In other embodiments, the draw call labels are derived by hashing one or more properties associated with the objects to be drawn. For example, a frame may have a number of draw calls, each draw call being used to draw a particular object. Properties associated with an object to be drawn may be hashed to form a label for the draw call associated with that object.

Next, a point/region of the current frame with a particular draw call label is matched with a point/region of a previous frame that has the same draw call label as described at 503. This may be done using a spatial index, which will be described in more detail below. In some embodiments, individual points in a current frame are matched with individual points in a previous frame. In other embodiments, regions (e.g., a set of individual points) in a current frame are matched with regions (e.g., a set of individual points) in a previous frame.

Once a point/region of the current frame is matched with a point/region of a previous frame, a motion vector may be derived for that point/region as described at 505. In some embodiments, the motion vector may simply be the difference between the screen coordinates of the point/region in the current frame and the screen coordinates of the matching point/region in the previous frame.

A determination is then made as to whether any more points/regions need to be matched as described at 507. If there are no more points/regions to be matched, then the method ends as described at 509. If there are more points/regions to be matched, then the method moves back to step 503, where another point/region of the current frame is matched.

By utilizing draw call labels, a point/region in a current frame need only be compared to those points/regions in the previous frame with a matching draw call label rather than comparing a point/region in a current frame to the entirety of the previous frame, thereby reducing the search space needed to perform matching.

Figure 6:
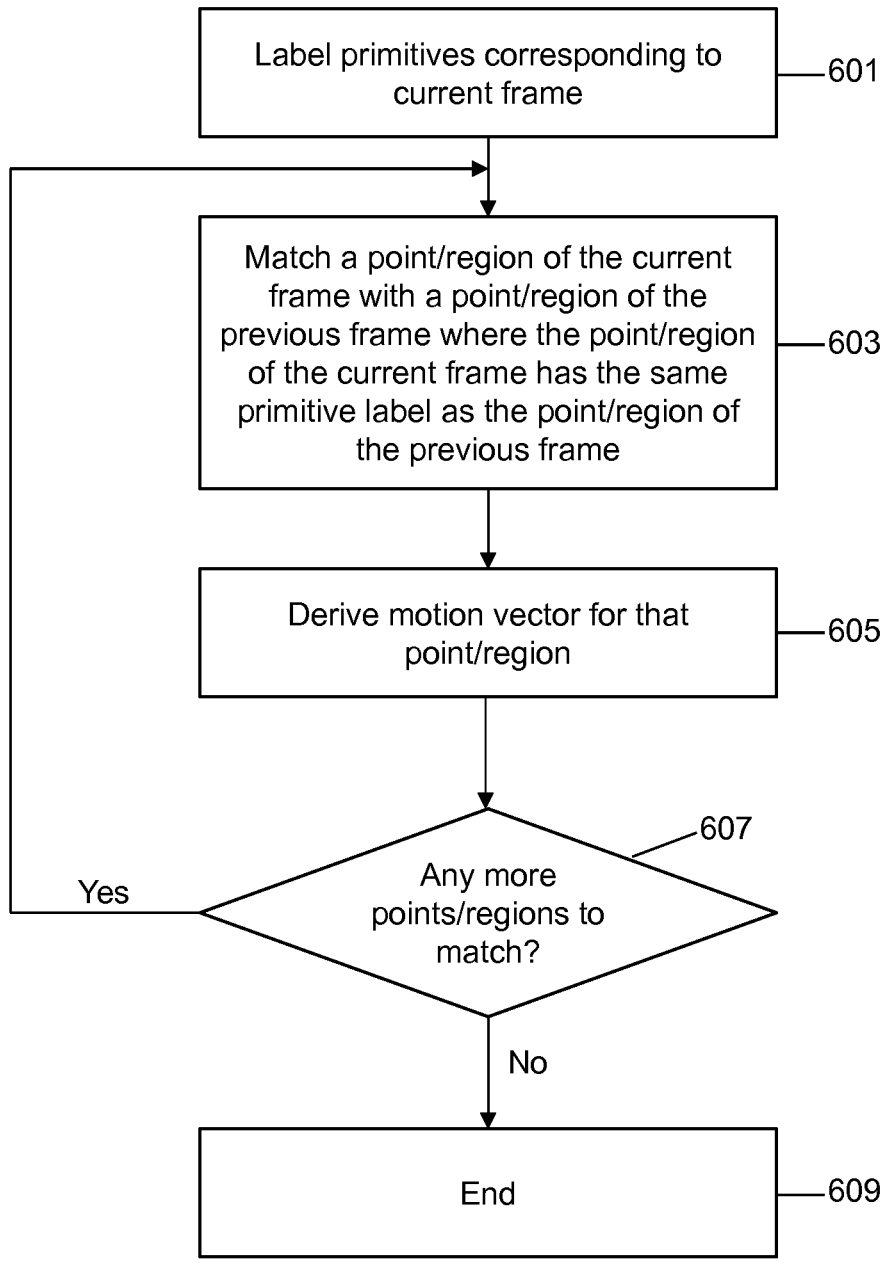
FIG. 6 is a flow chart illustrating a method for determining motion vectors for points/regions of a video frame that utilizes primitive labels according to some embodiments.

FIG. 6 is a flow chart illustrating a method for determining motion vectors for points/regions of a video frame that utilizes primitive labels according to some embodiments. Primitives corresponding to a current frame are labeled as described at 601. In some embodiments, the primitive labels are derived from the vertices for primitives. For example, each primitive may be associated with a set of vertices that may be used to form a unique index for that primitive.

Next, a point/region of the current frame with a particular primitive label is matched with a point/region of a previous frame that has the same primitive call label as described at 603. This may be done using a spatial index, which will be described in more detail below. In some embodiments, individual points in a current frame are matched with individual points in a previous frame. In other embodiments, regions (e.g., a set of individual points) in a current frame are matched with regions (e.g., a set of individual points) in a previous frame.

Once a point/region of the current frame is matched with a point/region of a previous frame, a motion vector may be derived for that point/region as described at 605. In some embodiments, the motion vector may simply be the difference between the screen coordinates of the point/region in the current frame and the screen coordinates of the matching point/region in the previous frame.

A determination is then made as to whether any more points/regions need to be matched as described at 607. If there are no more points/regions to be matched, then the method ends as described at 609. If there are more points/regions to be matched, then the method moves back to step 603, where another point/region of the current frame is matched.

By utilizing primitive labels, a point/region in a current frame need only be compared to those points/regions in the previous frame with a matching primitive label rather than comparing a point/region in a current frame to the entirety of the previous frame, thereby reducing the search space needed to perform matching.

Figure 7:
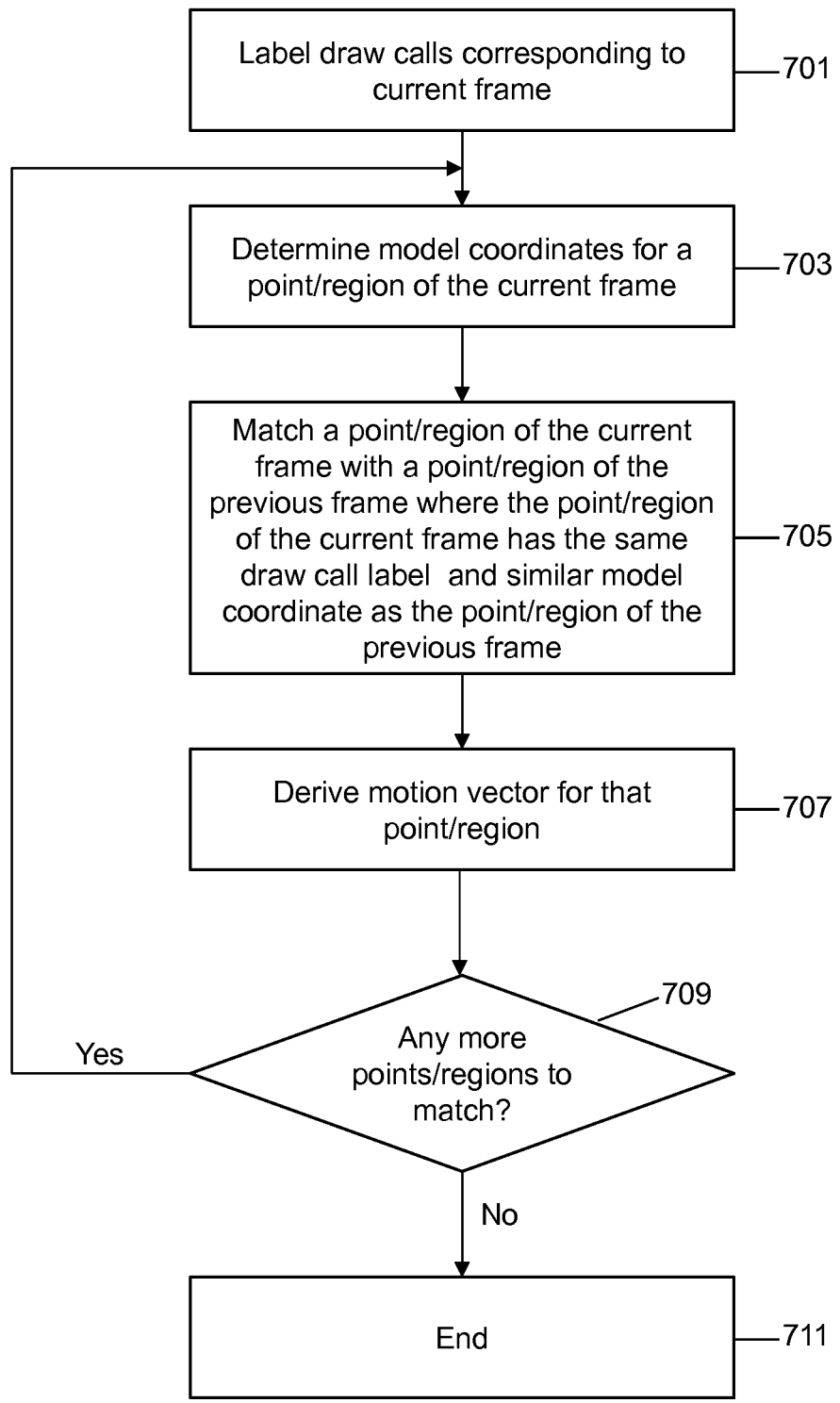
FIG. 7 is a flow chart illustrating a method for determining motion vectors for points/regions of a video frame that utilizes draw call labels and model coordinates according to some embodiments.

FIG. 7 is a flow chart illustrating a method for determining motion vectors for points/regions of a video frame that utilizes draw call labels and model coordinates according to some embodiments. Draw calls corresponding to a current frame are labeled as described at 701. A model coordinate for a point/region of the current frame is then determined as described at 703.

Next, a point/region of the current frame with a particular draw label and a particular model coordinate is matched with a point/region of a previous frame that has the same draw call label and similar model coordinate as described at 705. This may be done using a spatial index, which will be described in more detail below. In some embodiments, the process of matching may involve first finding a matching draw call label in the previous frame that matches the draw call label associated with the point/region of the current frame and then determining a point/region in the previous frame that has similar model coordinates to the model coordinates of the point/region in the current frame.

In some embodiments, the point/region of the previous frame with model coordinates that most closely match the point/region of the current frame is determined based on minimizing a metric computed on the model coordinates. In some embodiments, the metric is a Minkowski distance. In other embodiments, the metric is a city block metric.

In some embodiments, the model coordinates for the point/region in the current frame may be related to the model coordinates for the matching point/region in the previous frame by an affine or perspective transform. In some embodiments the transform may be estimated by minimizing residual differences in pixel coordinates and used to calculate a position for the matching point/region in the previous frame with sub-pixel resolution.

Once a point/region of the current frame is matched with a point/region of a previous frame, a motion vector may be derived for that point/region as described at 707. In some embodiments, the motion vector may simply be the difference between the screen coordinates of the point/region in the current frame and the screen coordinates of the matching point/region in the previous frame.

A determination is then made as to whether any more points/regions need to be matched as described at 709. If there are no more points/regions to be matched, then the method ends as described at 711. If there are more points/regions to be matched, then the method moves back to step 703, where model coordinates are determined for another point/region of the current frame.

By utilizing draw call labels and model coordinates, a point/region in a current frame need only be compared to those points/regions in the previous frame with a matching draw call label and similar model coordinates rather than comparing a point/region in a current frame to the entirety of the previous frame, thereby reducing the search space needed to perform matching.

Figure 8:
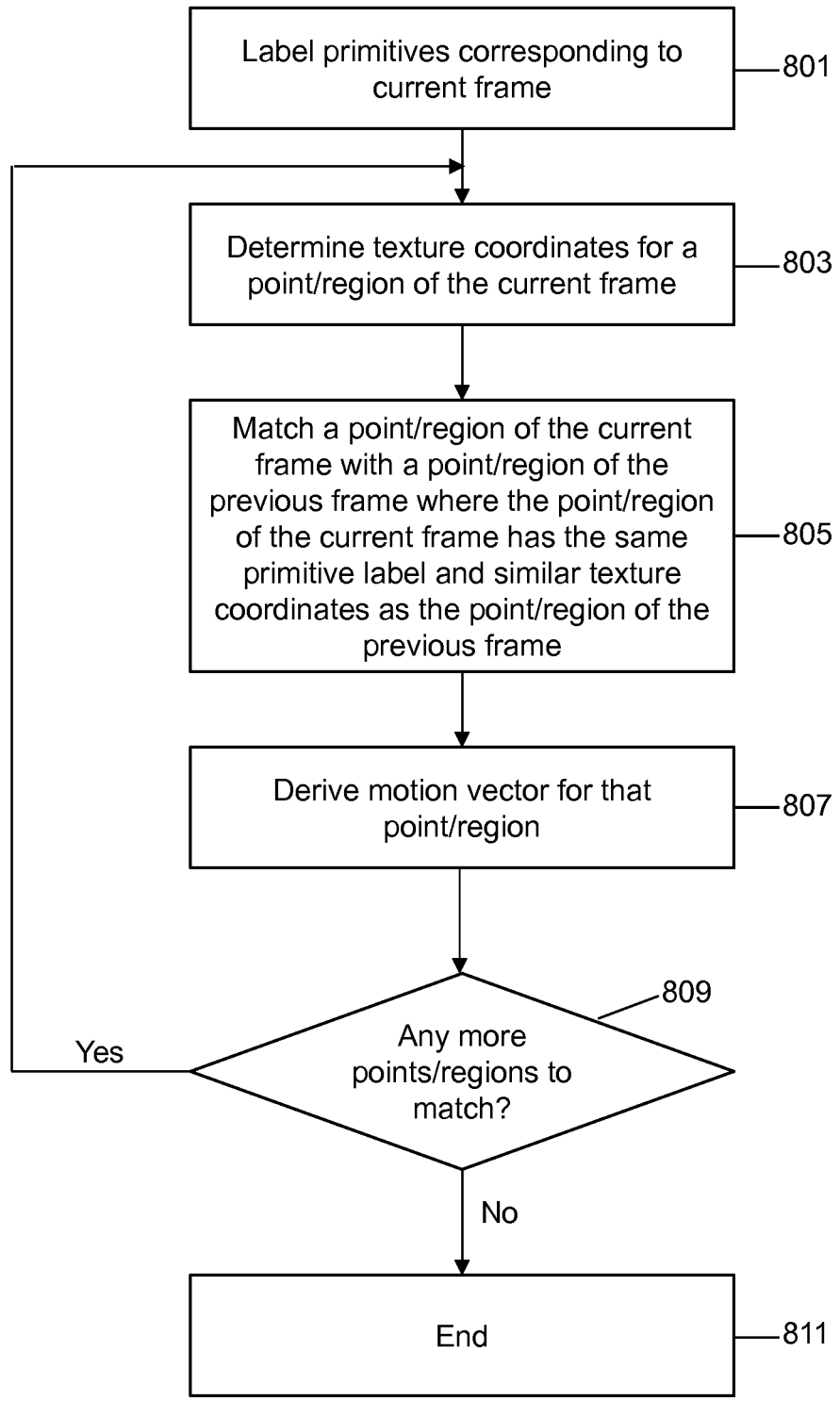
FIG. 8 is a flow chart illustrating a method for determining motion vectors for points/regions of a video frame that utilizes primitive labels and texture coordinates according to some embodiments

FIG. 8 is a flow chart illustrating a method for determining motion vectors for points/regions of a video frame that utilizes primitive labels and texture coordinates according to some embodiments. Draw calls corresponding to a current frame are labeled as described at 801. A texture coordinate for a point/region of the current frame is then determined as described at 803.

Next, a point/region of the current frame with a particular primitive label and a particular texture coordinate is matched with a point/region of a previous frame that has the same primitive label and similar texture coordinate as described at 805. This may be done using a spatial index, which will be described in more detail below. In some embodiments, the process of matching may involve first finding a matching primitive label in the previous frame that matches the primitive label associated with the point/region of the current frame and then determining a point/region in the previous frame that has similar texture coordinates to the texture coordinates of the point/region in the current frame.

In some embodiments, the point/region of the previous frame with texture coordinates that most closely match the point/region of the current frame is determined based on minimizing a metric computed on the texture coordinates. In some embodiments, the metric is a Minkowski distance. In other embodiments, the metric is a city block metric.

In some embodiments, the texture coordinates for the point/region in the current frame may be related to the texture coordinates for the matching point/region in the previous frame by an affine or perspective transform. In some embodiments the transform may be estimated by minimizing residual differences in pixel coordinates and used to calculate a position for the matching point/region in the previous frame with sub-pixel resolution.

Once a point/region of the current frame is matched with a point/region of a previous frame, a motion vector may be derived for that point/region as described at 807. In some embodiments, the motion vector may simply be the difference between the screen coordinates of the point/region in the current frame and the screen coordinates of the matching point/region in the previous frame.

A determination is then made as to whether any more points/regions need to be matched as described at 809. If there are no more points/regions to be matched, then the method ends as described at 811. If there are more points/regions to be matched, then the method moves back to step 803, where texture coordinates are determined for another point/region of the current frame.

By utilizing primitive labels and texture coordinates, a point/region in a current frame need only be compared to those points/regions in the previous frame with a matching primitive label and similar texture coordinates rather than comparing a point/region in a current frame to the entirety of the previous frame, thereby reducing the search space needed to perform matching.

As discussed above, matching using any of the methods described in FIGS. 4-8 may be performed by way of a spatial index. A spatial index structure(s) may be used to perform lookups to allow points/regions of a current frame to be matched with points/regions of a previous frame(s).

In some embodiments, the spatial index may index each draw call label or primitive label separately. In such embodiments, a particular draw call label or primitive label of a current frame may be matched with a corresponding draw call label or primitive label of a previous frame.

In some embodiments, the spatial index may index multiple draw call labels or multiple primitive labels together. In such embodiments, a particular draw call label or primitive label of a current frame may be matched with a corresponding set of draw call labels or primitive labels of a previous frame.

In some embodiments, the spatial index utilizes bins that correspond to particular gridded regions of a frame.

In some embodiments, the spatial index corresponds to a two-dimensional space. This may occur when the spatial index is used to match points/regions of a current frame to points/regions of a previous frame using texture coordinates, as described above. In other embodiments, the spatial index corresponds to a three-dimensional space. This may occur when the spatial index is used to match points/regions of a current frame to points/regions of a previous frame using model space coordinates.

In some embodiments, the spatial index may be a grid. In other embodiments, the spatial index may be a linear index such as for example a linear octree or a linear quadtree.

In some embodiments the spatial index may be based on a space-filling curve. In other embodiments, the spatial index may be based on a heap.

In some embodiments, the spatial index structure may be re-used between frames. In some embodiments, only a subset of points/regions in a previous frame are indexed. In some embodiments, only a subset of points/regions in a current frame are looked up in the spatial index structure.

A supplemental mechanism for performing matching between points/regions of a current frame and points/regions of a previous frame may be used to greatly reduce the number of required index lookups. This mechanism involves finding a potential matching point M in a previous frame for a point P in a current frame. This is done by finding a point P' in the current frame, which is in the neighborhood of point P and then finding its corresponding matching point M' in the previous frame. The search for a potential matching point M in the previous frame is then limited to the neighborhood that includes M'. The potential matching point M is then accepted if the distance between point M in the previous frame and point P in the current frame is relatively small compared to the distance between point P in the current frame and its neighbors in the current frame. This mechanism may be performed using texture coordinates associated with the point P or model space coordinates associated with the point P.

Once the points/regions of a current frame have been matched to points/regions of a previous frame, motion vectors for each point/region of the current frame may be determined as described above. Because the motion vectors have been determined based on various matching algorithms, their accuracy is not always guaranteed. As such, those motion vectors may be post-processed to improved reliability and accuracy.

Figure 9:
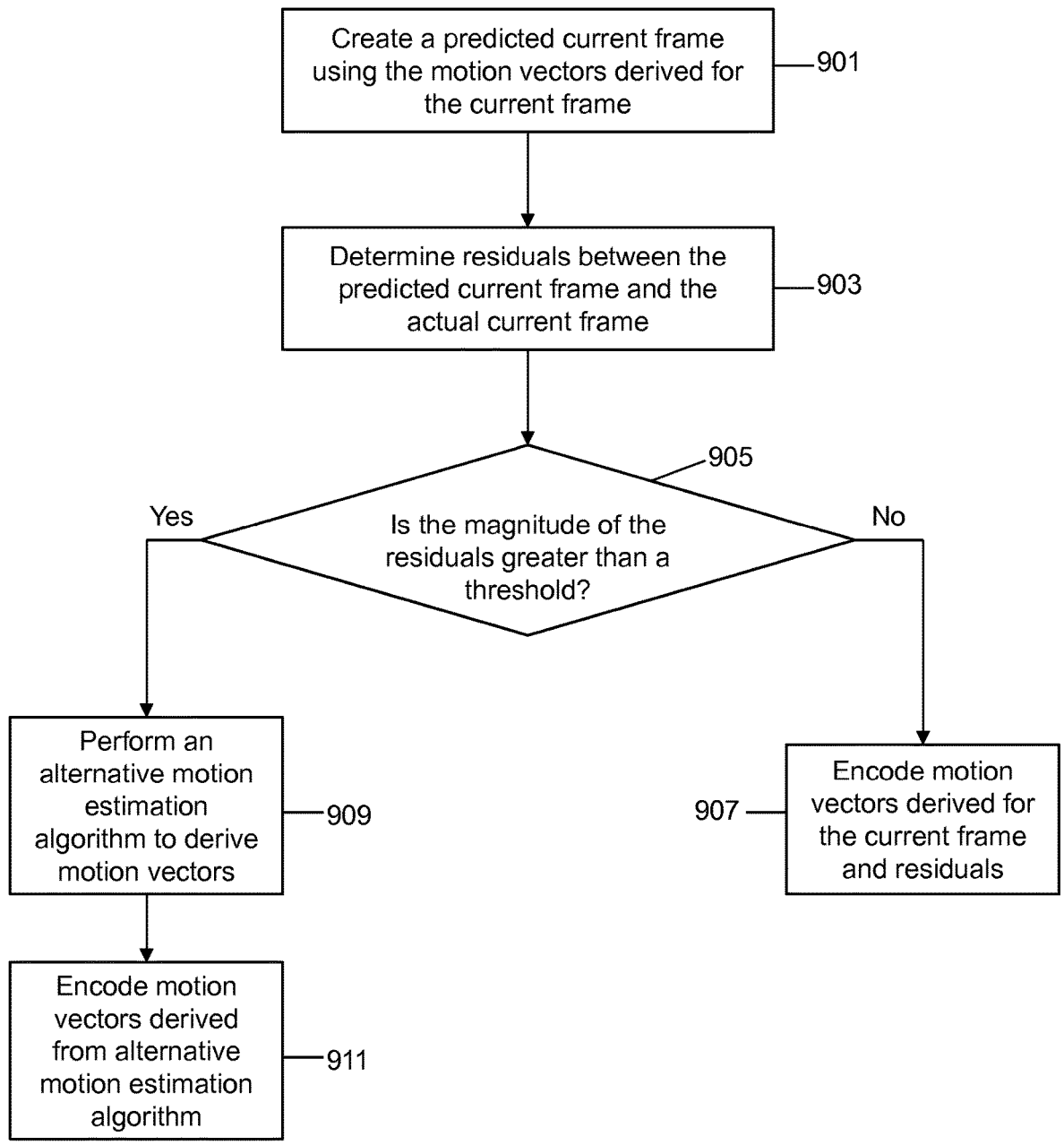
FIG. 9 is a flowchart that illustrates a method for post-processing motion vectors according to some embodiments.

FIG. 9 is a flowchart that illustrates a method for post-processing motion vectors according to some embodiments. Once all of the motion vectors for a current frame have been determined using any of the methods described above with respect to FIGS. 4-8, a predicted current frame may be created using the motion vectors derived for the current frame as described at 901. This involves applying the derived motion vectors to a previous frame to generate the predicted current frame.

The predicted current frame is then compared to the actual current frame to determine any residuals between the predicted current frame and the actual current frame as described at 903. These residuals represent differences between the predicted current frame and the actual current frame.

A determination is then made as to whether the magnitude of the residuals is greater than a threshold level as described at 905. Any number of metrics may be used to determine whether the magnitude of the residuals is greater than the threshold level.

If the magnitude of the residuals is less than the threshold level, then the derived motion vectors may be encoded for the current frame along with the residuals as described at 903. If however, the magnitude of the residuals is greater than the threshold level, then an alternative motion estimation algorithm may be performed to derive motion vectors for the current frame as described at 909. The motion vectors derived from the alternative motion estimation algorithm may then be encoded as described at 911.

In addition to utilizing graphics information from the video game program to perform a label-based encoding approach, geometry information may also be derived from the graphics information to perform a geometry-based encoding approach, which will be described in greater detail below.

Figure 10:
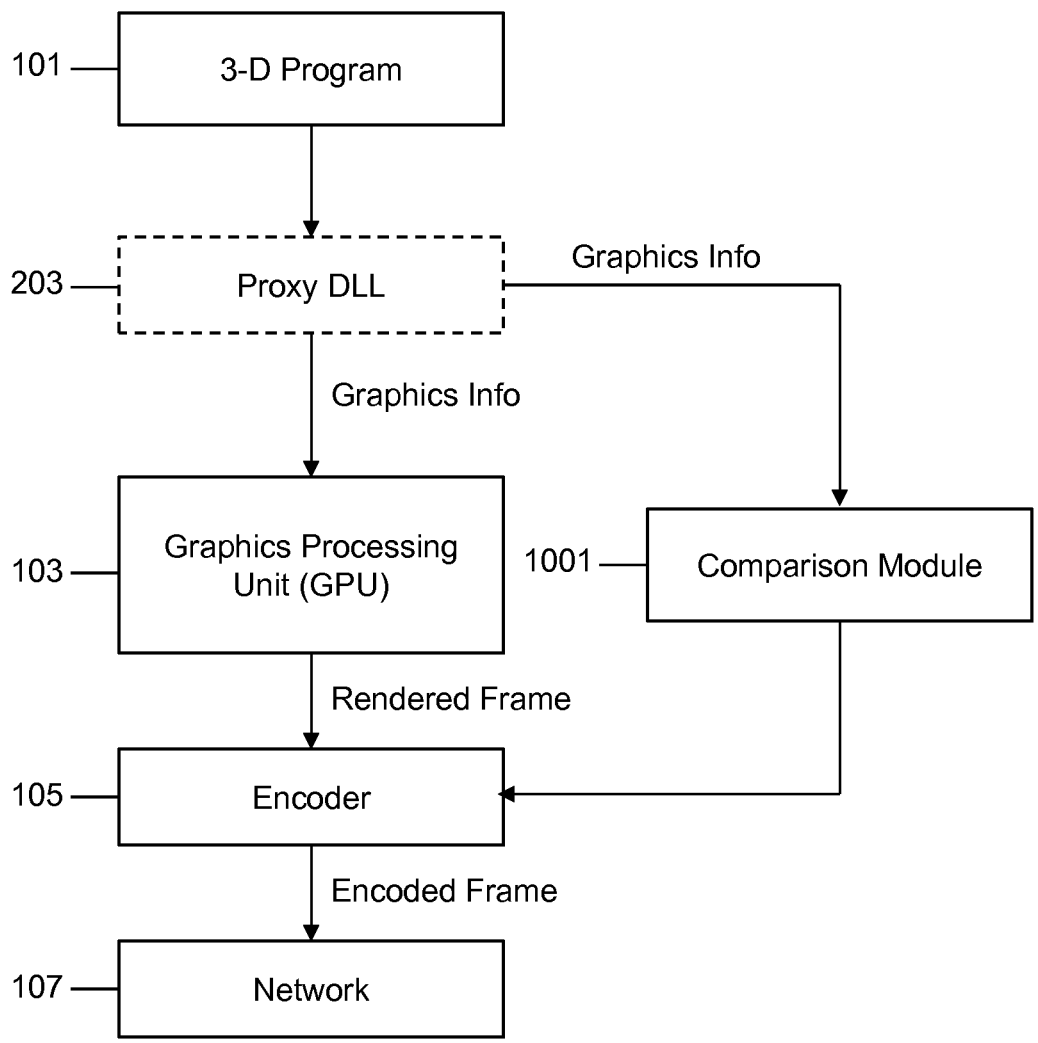
FIG. 10 illustrates a method for obtaining geometry information to be used for performing a geometry-based encoding approach according to some embodiments.

FIG. 10 illustrates a method for obtaining geometry information to be used for performing a geometry-based encoding approach according to some embodiments. In FIG. 10, an intermediate software layer, referred to herein as a proxy DLL 203 may be inserted in the video encoding pipeline between the video program 101 and the GPU 103. The proxy DLL 203 may intercept graphics information from the video program 101, and provide a copy of this intercepted graphics information to both the GPU 103 and a comparison module 1001.

The comparison module 1001 may then derive geometry information from the graphics information to perform the geometry based encoding approach. In performing the geometry based encoding approach, the comparison module 1001 may first derive geometric information for a previous frame. This geometric information may include screen positions for each vertex associated with the previous frame. The comparison module 1001 may then derive geometric information for a current frame, which may also include screen positions for each vertex associated with the current frame. The comparison module may store two or more sets of geometric information at a time in order to perform the geometry-based encoding approach.

The motion vector associated with each vertex in the current frame may then be calculated. This may be accomplished by determining the difference between the screen position for a vertex in the current frame and the screen position for its corresponding vertex in the previous frame. After calculating the motion vector for each vertex in the current frame, the motion vector of each pixel of the current frame by then be interpolated from the motion vectors of each vertex of the current frame.

After the motion vectors have been determined they are then forwarded to the encoder 105, which encodes the video frame using the determined motion vectors.

Figure 11:
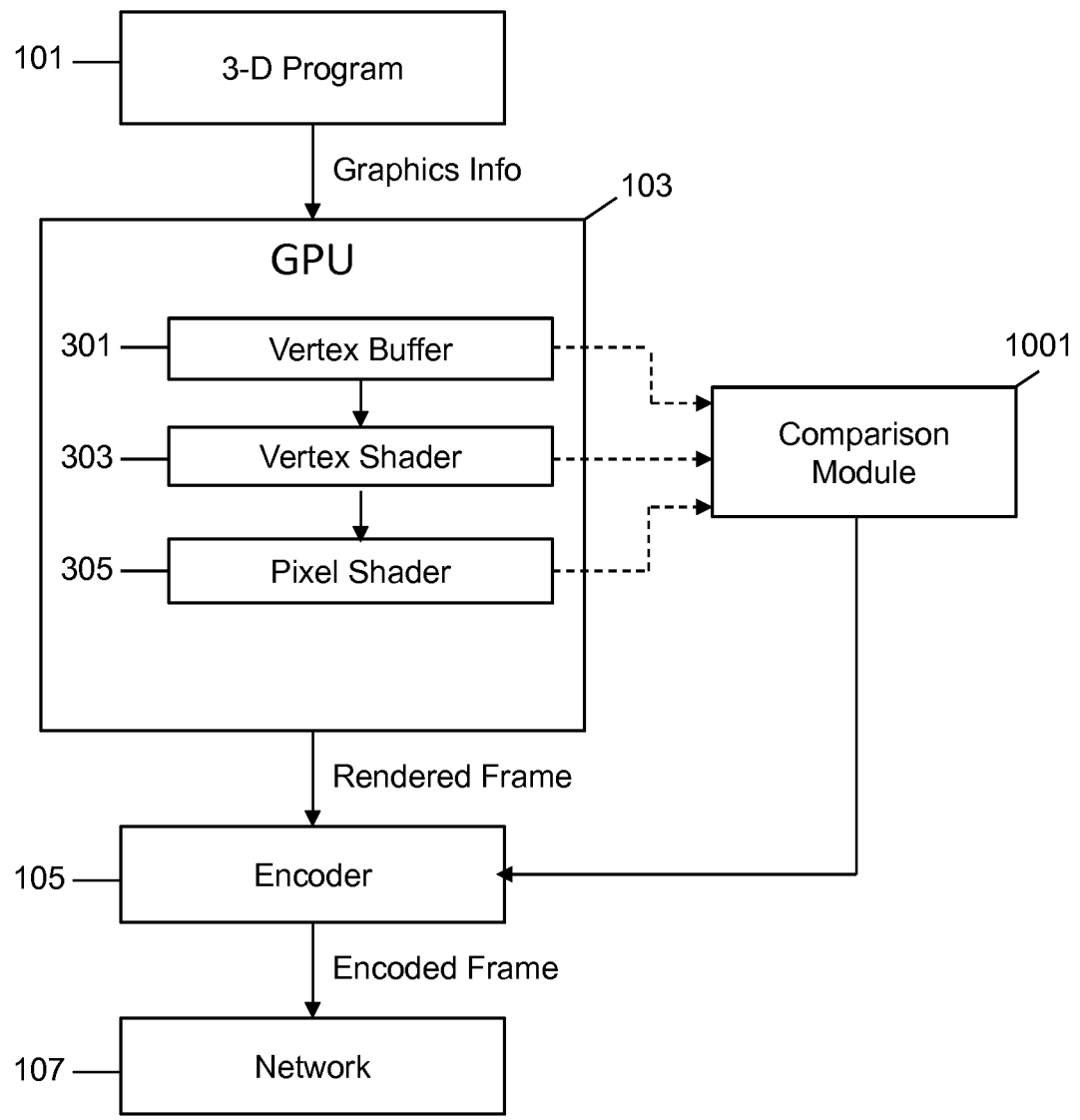
FIG. 11 illustrates an alternative method for obtaining geometry information to be used for performing a geometry-based encoding approach according to some embodiments.

FIG. 11 illustrates an alternative method for obtaining geometry information to be used for performing a geometry-based encoding approach according to some embodiments. In FIG. 3, the comparison module 1001 may be configured to retrieve geometric information information directly from the GPU 103. The GPU may include a vertex buffer 301, a vertex shader 303, and a pixel shader 305. The vertex buffer 301 contains vertex information in a three-dimensional model space. The vertex shader 303 transforms the three-dimensional model space vertex information into two-dimensional vertex information. The pixel shader 305 applies color and texture to individual pixels in the two-dimensional space. For example, the vertex buffer 301 may include three-dimensional model space vertex information for a particular item to be rendered for a video frame. The vertex buffer 301 may pass on that information to the vertex shader 303, which transforms the three-dimensional model space vertex information into two-dimensional vertex information. This two-dimensional vertex information may then be passed on the pixel shader 305, which applies color and texture to the individual pixels that correspond to the item described by the two-dimensional vertex information.

The geometric information utilized for performing the geometry-based encoding approach may be retrieved directly from the GPU, and in particular the vertex shader 303 of the GPU 103. Because the vertex shader 303 transforms three-dimensional model space vertex information into two-dimensional vertex information, the vertex shader 303 includes the geometric information necessary to perform the geometry-based encoding approach.

The comparison module 1001 may then utilize this geometric information to determine motion vectors associated with the current frame. This may be accomplished by determining the difference between the screen position for a vertex in the current frame and the screen position for its corresponding vertex in the previous frame using the information obtained from the vertex shader 303 of the GPU 103. After calculating the motion vector for each vertex in the current frame, the motion vector of each pixel of the current frame by then be interpolated from the motion vectors of each vertex of the current frame.

Figure 12:
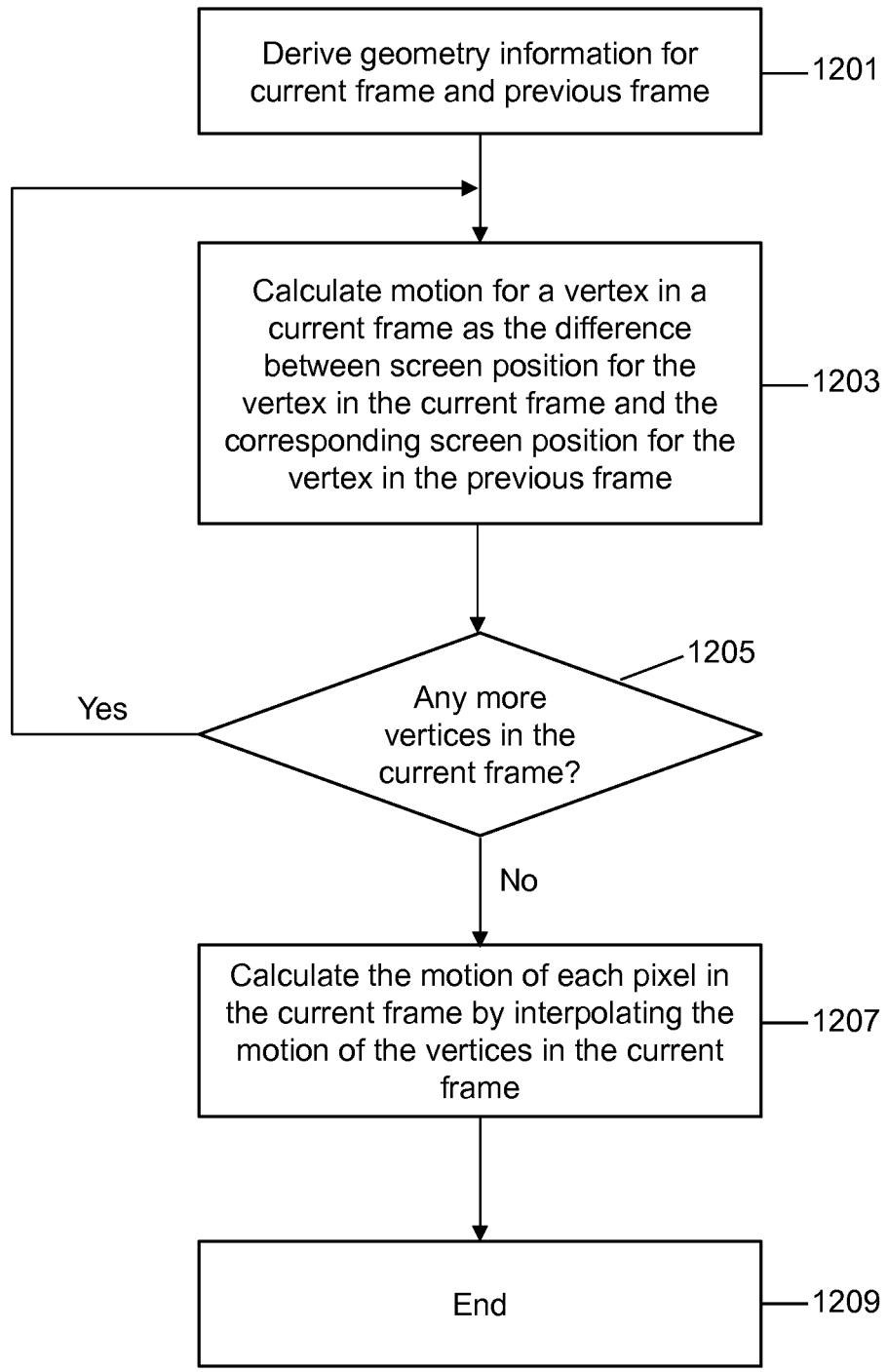
FIG. 12 is a flow chart illustrating a general method for determining motion vectors for points/regions of a video frame using a geometry-based encoding approach according to some embodiments.

FIG. 12 is a flow chart illustrating a general method for determining motion vectors for points/regions of a video frame using a geometry-based encoding approach according to some embodiments. Geometry information for a current frame and a previous frame may first be derived as described at 1201. In some embodiments, the graphics information from the video game program may be intercepted and transformed into geometry information, as described above. In other embodiments, the geometry information may be directly obtained from the GPU, as described above.

Next, a motion vector for a vertex of the current frame is calculated as described at 1203. In calculating a motion vector for a vertex of the current frame, a difference between the screen position for the vertex in the current frame and the screen position for a corresponding vertex in the previous frame is calculated. As mentioned above, the geometry information for the current and previous frame may include screen positions for vertices associated with that frame. As such, the motion vector for a vertex in a current frame may be computed by simply subtracting the screen position of the corresponding vertex in the previous frame from the screen position of the vertex in the current frame.

A determination is then made as to whether motion vectors for any more vertices in the current frame need to be calculated as described at 1205. If there are more motion vectors for vertices in the current frame to be calculated, then the method returns to step 1203, where another motion vector for a vertex of the current frame is calculated. If there are no more motion vectors for vertices in the current frame to be calculated, then motion vectors for each pixel in the current frame are calculated as described at 1207. The motion vectors for each pixel in the current frame may be calculated by interpolating the motion vectors of the vertices in the current frame.

System Architecture Overview

Figure 13:
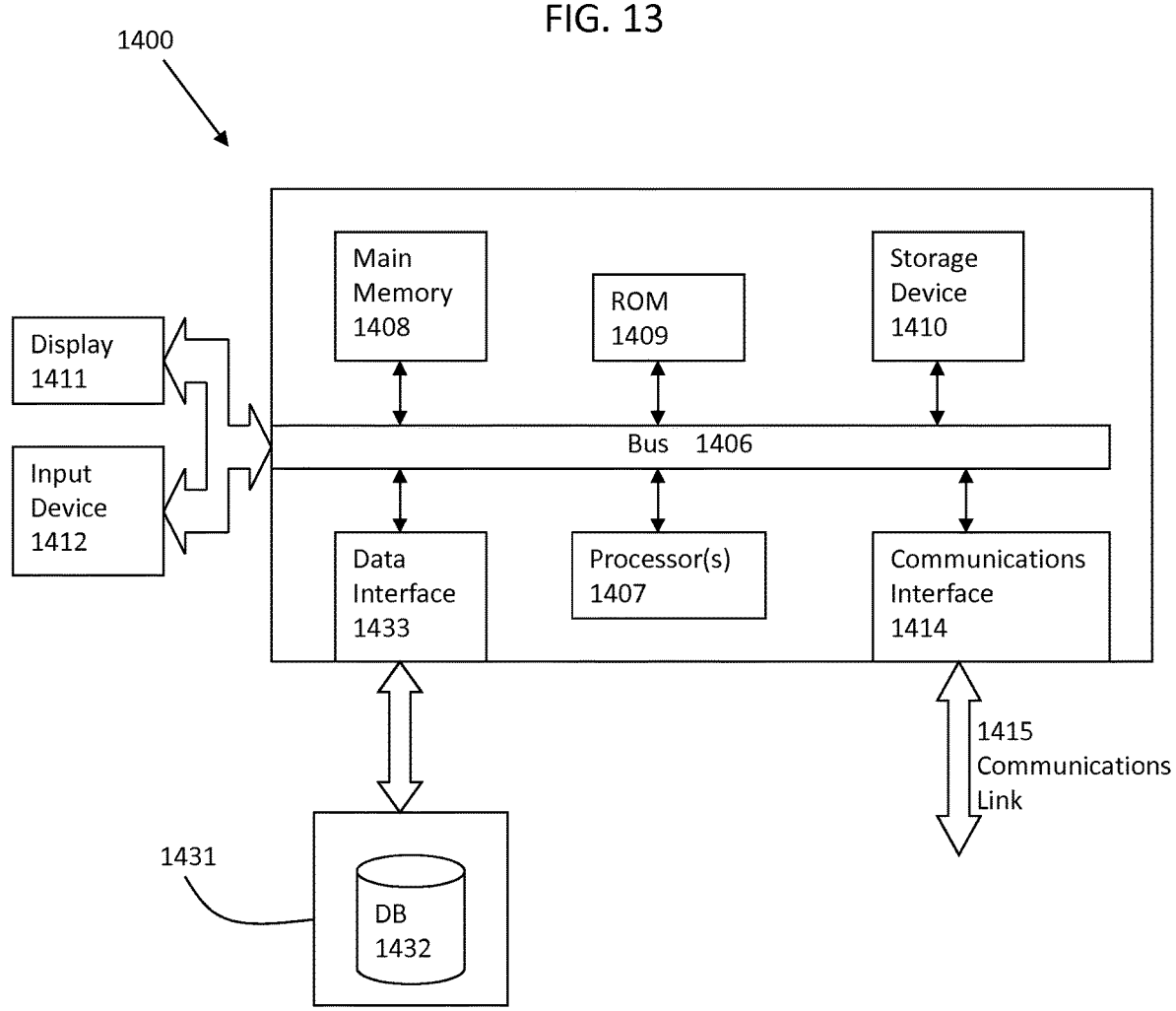
FIG. 13 depicts a computerized system for implementing a label based approach for video encoding.

FIG. 13 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. Computer system 1400 may communicate through a data interface 1433 to a database 1432 on an external storage device 1431.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than restrictive sense.

Although particular embodiments have been shown and described, it will be understood that they are not intended to limit the claimed invention, and it will be made obvious to those skilled in the art that various changes and modifications may be made without departing from the spirit and scope of the claimed invention. The specification and drawings are, accordingly, to be regarded in an illustrative rather than restrictive sense. The claimed invention is intended to cover alternatives, modifications, and equivalents.

What is claimed is:

1. A method for encoding a current video frame comprising:
    rendering the current video frame to generate a plurality of primitives each including a point/region represented as a two-dimensional geometric shape;
    generating a label for each of the primitives of the current video frame using graphics information for the current video frame, the label being used to identify the primitive of a rendered video frame, the graphic information including information corresponding to the two-dimensional geometric shape in a three-dimensional model space of the primitive;
    determining a previous video frame associated with the current video frame, the previous video frame being labeled using the graphic information;
    matching one of the plurality of primitives of the current video frame with at least one of the plurality of primitives of the previous video frame using the label for the primitive of the current video frame, the matched primitive of the current video frame having the same label as the at least one of the plurality of primitives of the previous video frame; and
    deriving motion vectors for the point/region corresponding to the matched primitive of the current video frame using a point/region corresponding to the at least one of the plurality of primitives of the previous frame.

2. The method of claim 1, wherein the primitive of the current video frame is labeled with information associated with a draw call associated with the current video frame.

3. The method of claim 2, wherein the primitive for the current video frame is matched with a primitive of the previous video frame having a same draw call label.

4. The method of claim 2, wherein the primitive for the current video frame is also labeled with a model space coordinate associated with the point/region for the current video frame.

5. The method of claim 4, wherein the primitive for the current video frame is matched with a primitive of the previous video frame having a same draw call label and a similar model space coordinate.

6. The method of claim 1, wherein the primitive for the current video frame is matched with a primitive of the previous video frame having a same primitive label.

7. The method of claim 1, wherein the primitive for the current video frame is also labeled with a texture coordinate.

8. The method of claim 7, wherein the primitive for the current video frame is matched with a primitive of the previous video frame having a same primitive label and a similar texture coordinate.

9. The method of claim 1, wherein matching the primitive for the current video frame comprises matching the primitive for the current video frame with primitives of more than one previous video frame.

10. The method of claim 1, wherein the graphics information is obtained by intercepting the graphics information generated by a video program.

11. The method of claim 1, wherein the graphics information is obtained by retrieving the graphics information from a graphics processing unit (GPU).

12. The method of claim 1, wherein deriving the motion vectors for the point/region corresponding to the matched primitive of the current video frame comprises using at least one of: a sum of absolute transformed differences (SATD), a sum of absolute differences (SAD), a sum of squared differences (SSD), or a sum of absolute inverse discrete cosine transform (IDCT) coefficients.

13. The method of claim 1, further comprising:
    creating a predicted current frame using the motion vectors derived for the current frame;
    comparing the predicted current frame to the current frame to generate residuals for the current frame;
    encoding the current frame with the derived motion vectors when the residuals are less than a threshold; and
    performing an alternative motion estimation algorithm for the current frame when the residuals are greater than a threshold.

14. A computer program product comprising a non-transitory computer usable medium having executable code to execute a method for encoding a current video frame, the method comprising:
    rendering the current video frame to generate a plurality of primitives each including a point/region represented as a two-dimensional geometric shape;
    generating a label for each of the primitives of the current video frame using graphics information for the current video frame, the label being used to identify the primitive of a rendered video frame, the graphic information including of information corresponding to the two-dimensional geometric shape in a three-dimensional model space of the primitive;
    determining a previous video frame associated with the current video frame, the previous video frame having been labeled using the graphic information;
    matching one of the plurality of primitives of the current video frame with at least one of the plurality of primitives of the previous video frame using the label for the primitive of the current video frame, the matched primitive of the current video frame having the same label as the at least one of the plurality of primitives of the previous video frame; and
    deriving motion vectors for the point/region corresponding to the matched primitive of the current video frame using a point/region corresponding to the at least one of the plurality of primitives of the previous frame.

15. A system for encoding a current video frame, comprising:

a computer processor to execute a set of program code instluctions;
a memory to hold the program code instructions, in which the program code instructions comprises program code for:
  rendering the current video frame to generate a plurality of primitives each including a point/region represented as a two-dimensional geometric shape;
  generating a label for each of the primitives of the current video frame using graphics information for the current video frame, the label being used to identify the primitive of a rendered video frame, the graphic information including of information corresponding to the two-dimensional geometric shape in a three-dimensional model space of the primitive;
  determining a previous video frame associated with the current video frame, the previous video frame having been labeled using the graphic information;
  matching one of the plurality of primitives of the current video frame with at least one of the plurality of primitives of the previous video frame using the label for the primitive of the current video frame, the matched primitive of the current video frame having the same label as the at least one of the plurality of primitives of the previous video frame; and
  deriving motion vectors for the point/region corresponding to the matched primitive of the current video frame using a point/region corresponding to the at least one of the plurality of primitives of the previous frame.

* * * * *